United States Patent [19]

Takimoto et al.

[11] Patent Number: 4,713,419

[45] Date of Patent: Dec. 15, 1987

[54] THERMOPLASTIC OLEFIN ELASTOMER

[75] Inventors: Masahiro Takimoto, Mie; Junji Takeuchi, Nagoya; Yoshio Yamazaki, Aichi, all of Japan

[73] Assignee: Toyoda Gosei Co., Ltd., Nishikasugai, Japan

[21] Appl. No.: 857,308

[22] Filed: Apr. 30, 1986

[30] Foreign Application Priority Data

Apr. 30, 1985 [JP] Japan ................... 60-93226

[51] Int. Cl.⁴ ................ C08L 23/10; C08L 23/16; C08L 23/08
[52] U.S. Cl. ........................... 525/211; 525/93; 525/222
[58] Field of Search ................ 525/211, 93, 222

[56] References Cited

U.S. PATENT DOCUMENTS

| | | | |
|---|---|---|---|
| 3,555,110 | 1/1971 | McConnell et al. | 525/93 |
| 3,758,643 | 9/1973 | Fischer. | |
| 3,806,558 | 4/1974 | Fischer. | |
| 3,862,106 | 1/1975 | Fischer. | |
| 4,210,579 | 7/1980 | Grigo et al. | 525/211 |
| 4,212,787 | 7/1980 | Matsuda et al. | |
| 4,247,652 | 1/1981 | Matsuda et al. | |
| 4,255,323 | 3/1981 | Barkis et al. | 525/93 |
| 4,481,334 | 11/1984 | Yoshimura et al. | 525/211 |

FOREIGN PATENT DOCUMENTS 56-127646  10/1981  Japan.

*Primary Examiner*—Carman J. Seccuro
*Attorney, Agent, or Firm*—Cushman, Darby & Cushman

[57] ABSTRACT

There is provided a thermoplastic olefin elastomer of polyblend composed of 30 to 70 wt % of ethylene-propylene-diene terpolymer (EPDM), 10 to 30 wt % of ethylene-vinyl acetate copolymer (EVA), and 20 to 50 wt % of polypropylene (PP). The EPDM is specified by the Mooney viscosity, propylene content, and third component. The EVA is specified by the VA content and number-average molecular weight. The PP is specified by the number-average molecular weight. This elastomer is suitable for use as a raw material for automotive exterior trim such as side molding, bumper, and mud guard which are produced by injection molding. The elastomer also affords molded items having a good matte-finished appearance. The polyblend obviates the process for partial crosslinking which was necessary for the preparation of conventional elastomer for injection molding.

4 Claims, No Drawings

THERMOPLASTIC OLEFIN ELASTOMER

BACKGROUND OF THE INVENTION

The present invention relates to a thermoplastic olefin elastomer (abbreviated as TPO hereinafter), and more particularly, it relates to a TPO suitable for use as an injection molding material for automotive exterior trim such as side molding, bumper, and mud guard.

TPO has come to find use as a raw material for automotive exterior trim because of its low specific gravity, good low temperature resistance, and good weatherability. Recently, the automotive exterior trim is required to have a matte-finished appearance. Unfortunately, trim of matte-finished uniform appearance cannot be made from a conventional TPO by injection molding, because the resulting molded item has flow marks (or swirl marks) attributable to the rubber component (EPDM) contained therein.

Flow marks can be eliminated and injection molding with a good matte-finished appearance can be obtained if the rubber component in TPO is partly crosslinked. (See Japanese Patent Laid-open Nos. 18943/1972, 26838/1973, 145847/1978, 142753/1977, and 1386/1979.) The partial crosslinking process requires a difficult control in the production of TPO injection molding materials. Thus, TPO of stable quality is difficult to produce and, as the result, the TPO injection molding material is expensive.

In the meantime, the abbreviations used in this specification are defined as follows:
TPO: Thermoplastic olefin elastomer
EPDM: Ethylene-propylene-diene terpolymer
EVA: Ethylene-vinyl acetate copolymer
PP: Polypropylene
$\overline{Mn}$: Number-average molecular weight
wt%: Weight percentage

SUMMARY OF THE INVENTION

It is an object of the present invention to provide a TPO which affords injection moldings having a good (uniform) matte-finished appearance. The TPO of this invention is produced by simple mixing without the process for partial crosslinking which requires accurate control for temperature and pressure. Thus it is another object of the invention to provide a TPO of low production cost.

The TPO of this invention is a polyblend composed of 30 to 70 wt% of EPDM, 20 to 30 wt% of EVA, and 20 to 50 wt% of PP, said EPDM being specified by a Mooney viscosity, propylene content, and third component, said EVA being specified by a VA content and $\overline{Mn}$, and said PP being specified by an $\overline{Mn}$.

DESCRIPTION OF THE PREFERRED EMBODIMENTS

The TPO of this invention is a polyblend composed of (1) EPDM, (2) EVA, and (3) PP the blending ratio of the three components is shown later.

The TPO is made into an injection molding material in pellet form by incorporating with a heat stabilizer, antioxidant, coloring agent, etc., followed by tumbling for 1 to 2 minutes, extrusion into strands by a single-or twin-screw extruder, water-cooling, and pelletizing.

The TPO of this invention can also be used as other molding materials for extrusion molding, blow molding, and compression molding.

(1) The EPDM as one contituent of TPO of this invention is one which is specified by a Mooney viscosity $ML_{1+4}$(100° C.) of 60 to 100, a propylene content of 20 to 40 wt%, and a third component of ethylidenenorbornene. The symbol $ML_{1+4}$(100° C.) denotes a viscosity unit a Mooney viscometer equipped with a large disc registers after preheating at 100° C. for 1 minute and rotation for 4 minutes.

With a Mooney viscosity less than 60, the resulting moldings are poor in strength required for automotive exterior trim and also in matte-finished appearance. (See Comparative Example 1.) With a Mooney viscosity higher than 100, the resulting molding material is poor in flowability and is liable to flow marks which lead to an irregular appearance, although a matte-finished appearance is obtained. (See Comparative Example 2.)

With a propylene content less than 20 wt%, the molding material is poor in flowability and the resulting moldings lack a uniform appearance. With a propylene content greater than 40 wt%, the resulting molding are poor in strength required for automotive exterior trim and also in matte-finished appearance.

Where ethylidenenorbornene (ENB) as a third component is replaced by any other similar compound such as dicyclopentadiene (DCPD), the matte-finished appearance is not obtained. The reason for this is not known. (See Comparative Example 3.)

(2) The EVA as one constituent of TPO of this invention is one which is specified by a vinyl acetate content of 10 to 30 wt% and an $\overline{Mn}$ of 13,500 to 17,000.

With a vinyl acetate content less than 10 wt%, the resulting injection molded items tend to have swirl marks. With a vinyl acetate content greater than 20 wt%, the resulting molded items lack uniform appearance and have a low strength. (See Comparative Examples 8 and 9.)

With an $\overline{Mn}$ less than 13,500, the resulting moldings are poor in strength required for automotive exterior trim. With an $\overline{Mn}$ greater than 17,000, the resulting moldings lack a uniform appearance. (See Comparative Examples 6 and 7.)

(3) The PP as one constituent of TPO of this invention is one which is specified by an $\overline{Mn}$ of 30,000 to 110,000.

With an $\overline{Mn}$ less than 30,000, the resulting molding are poor in strength required for automotive exterior trim. With an $\overline{Mn}$ greater than 110,000, the resulting moldings lack uniform appearance due to poor flowability and hence flow marks. The PP may be a block copolymer containing not greater than 10 wt% of polyethylene.

(4) The mixing ratios of the above-mentioned constituents are 30 to 70 wt% for EPDM, 10 to 30 wt% for EVA, and 20 to 50 wt% for PP.

If the amount of EPDM is less than 30 wt%, the resulting molded items lack a matte-finished appearance. (See Comparative Example 4.) If the amount of EPDM is greater than 70 wt%, the resulting molded items lack strength required for automotive exterior trim and also lack a uniform matte-finished appearance, because of the relative decrease of PP in the formulation. (See Comparative Example 5.)

If the amount of EVA is less than 10 wt%, the resulting molded items lack a uniform matte-finished appearance. (See Comparative Exaple 10.) If the amount of EVA is greater than 30 wt%, the resulting molded items lack strength required for automotive exterior trim and also lack resistance to a wax remover. (See Comparative Example 11.)

If the amount of PP is less than 20 wt%, the resulting molded items lack strength required for automotive exterior trim. If the amount of PP is greater than 50 wt%, the resulting molded items lack a matte-finished appearance. (See Comparative Example 8.)

The invention is now described in more detail with reference to the following Examples and Comparative Examples.

Tables 1 to 3 show the properties of EPDM, EVA, and PP used in Examples and Comparative Examples. These three components were blended together according to the formulation shown in Table 4. (Each formulation contains 0.5 wt% of anti-oxidant.) After tumbling for 1 to 2 minutes, the blend was extruded into strands from a twin-screw extruder, followed by water cooling and pelletizing. Thus there was prepared injection molding mateials.

Each injection molding material was made into a molded item measuring 100×200×5 mm under the following conditions. Injection temperature: 220° C., injection pressure: 800 kgf/cm$^2$, injection time: 10 second, and mold temperature: 30° C. The resulting molded items were examined for appearance, resistance to wax remover, and weatherability. The results are shown in Table 1. It is to be noted that the molded items made from the TPO of this invention are satisfactory in matte-finish appearance, resistance to wax remover, and weatherability. The properties were measured according to the floowing methods.

(1) Gloss: Gloss was measured with a glossmeter (Model GM-3M, made by Murakami Shinkisai Gijutsu Kenkyusho) at an incidence angle of 60° and a reflection angle of 60°. The surface having a reflectance less than 10% was disignated as "matte" and the surface having a reflectance greater than 50% was designated as "glossy".

(2) Matte uniformity: Each sample was visually compared with a standard specimen of uniform matte finish. The sample equivalent to the standard specimen is indicated by an "0" mark, and the sample having apparent flow marks is indicated by an "x" mark.

(3) Resistance to wax remover: In accordance with JIS K6301 (immersion test), each sample was immersed in kerosene (at 80° C.) for 10 minutes, and the swelling (volume change) was measured. The sample which swelled less than 50% is indicated by an "0" mark and the sample which swelled more than 50% is indicated by an "x" mark.

(4) Weatherability: Samples were placed in sunshine weatherometer (made by Suga Shikenki Co., Ltd.) for 1000 hours. The sample which remained unchanged is indicated by an "0" mark, and the sample which greatly changed in appearance (cracks, whitening, bleeding, etc.) is indicated by an "x" mark.

TABLE 1

| EPDM | Mooney viscosity $ML_{1+4}$ | Iodine value | Third component |
|---|---|---|---|
| A | 47 | 6 | ENB |
| B | 66 | 14 | ENB |
| C | 90 | 15 | ENB |
| D | 105 | 15 | ENB |
| E | 85 | 19 | DCPD |

(Note)
ENB: Ethylidenenorbornene
DCPD: Dicyclopentadiene

TABLE 2

| EVA | Vinyl acetate content (wt %) | Mn |
|---|---|---|
| F | 14 | 23,000 |
| G | 19 | 15,000 |
| H | 25 | 31,000 |
| I | 28 | 14,000 |
| J | 28 | 15,000 |
| K | 33 | 20,600 |
| L | 41 | 18,500 |

TABLE 3

| PP | Ethylene content (wt %) | Mn |
|---|---|---|
| M | 0 | 50,000 |
| N | 3 | 50,000 |
| O | 8 | 40,000 |
| P | 8 | 50,000 |
| Q | 8 | 70,000 |
| R | 8 | 80,000 |
| S | 9 | 100,000 |

TABLE 4

| | EPDM (wt %) | EVA (wt %) | PP (wt %) | Appearance | Uniformity | Resistance to wax remover | Weatherability |
|---|---|---|---|---|---|---|---|
| Comparative Example 1 | A (50) | J (15) | O (35) | Glossy | x | o | o |
| Example 1 | C (50) | J (15) | O (35) | Matte | o | o | o |
| Comparative Example 2 | D (50) | J (15) | O (35) | Matte | x | o | o |
| Comparative Example 3 | E (50) | J (15) | O (35) | Glossy | x | o | o |
| Example 2 | B (50) | J (15) | O (35) | Matte | o | o | o |
| Comparative Example 4 | C (20) | J (15) | O (65) | Glossy | x | o | o |
| Example 3 | C (40) | J (15) | O (45) | Matte | o | o | o |
| Example 4 | C (60) | J (15) | O (25) | Matte | o | o | o |
| Comparative Example 5 | C (80) | J (15) | O (5) | Matte | x | o | o |
| Comparative Example 6 | C (50) | F (15) | O (35) | Matte | x | o | o |
| Example 5 | C (50) | G (15) | O (35) | Matte | o | o | o |
| Comparative Example 7 | C (50) | H (15) | O (35) | Matte | x | o | o |
| Example 6 | C (50) | I (15) | O (35) | Matte | o | o | o |
| Comparative Example 8 | C (50) | K (15) | O (35) | Matte | x | o | o |
| Comparative Example 9 | C (50) | L (15) | O (35) | Matte | x | o | o |
| Example 7 | C (50) | I (15) | M (35) | Matte | o | o | o |
| Comparative Example 10 | C (50) | I (5) | N (45) | Matte | x | o | o |
| Example 8 | C (50) | I (10) | P (40) | Matte | o | o | o |
| Example 9 | C (50) | I (25) | Q (25) | Matte | o | o | o |
| Comparative Example 11 | C (50) | I (35) | R (15) | Matte | o | x | o |
| Example 10 | C (50) | I (15) | S (35) | Matte | o | o | o |

What is claimed is:

1. A thermoplastic olefin elastomer of polyblend which comprises 30 to 70 wt% of ethylene-propylenediene terpolymer (EPDM), 10 to 30 wt% of ethylene-vinyl acetate copolymer (EVA), and 20 to 50 wt% of polypropylene (PP), said EPDM having a Mooney viscosity $ML_{1+4}$ (100° C.) of 60 to 100 and containing 20 to 40 wt% of propylene and ethylidenenorbornene as a third component, said EVA containing 10 to 30 wt% of vinyl acetate and having an $\overline{M}n$ of 13,500 to 17,000, and said PP having an $\overline{M}n$ of 30,000 to 110,000.

2. A thermoplastic olefin elastomer of polyblend as set forth in claim 1, wherein the PP is a block copolymer containing not greater than 10 wt% of polyethylene.

3. An injection molded product having a substantially uniform matte-finished surface consisting essentially of a thermoplastic olefin elastomer, said elastomer, comprising 30 to 70 wt% of ethylene-propylene-diene terpolymer (EPDM), 10 to 30 wt% of ethylene-vinyl acetate copolymer (EVA), and 20 to 50 wt% of polypropylene (PP), said EPDM having a Mooney viscosity $ML_{1+4}$ (100° C.) of 60 to 100 and containing 20 to 40 wt% of propylene and ethylidenenorbornene as a third component, said EVA containing 10 to 30 wt% of vinyl acetate and having an $\overline{M}n$ of 13,500 to 17,000, and said PP having an $\overline{M}n$ of 30,000 to 110,000.

4. The injection molded product according to claim 3, wherein said product is a bumper part, and mud guard or side molding.

* * * * *